(12) United States Patent
Bennett et al.

(10) Patent No.: US 8,667,087 B2
(45) Date of Patent: Mar. 4, 2014

(54) RETRIEVING SUBSTITUTE DATA TO REPLACE DAMAGED MEDIA DATA FOR PLAYBACK IN A MEDIA PLAYER

(75) Inventors: James D. Bennett, Hroznetin (CZ); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 800 days.

(21) Appl. No.: 12/323,298

(22) Filed: Nov. 25, 2008

(65) Prior Publication Data

US 2010/0128582 A1    May 27, 2010

(51) Int. Cl.
*G11B 20/10* (2006.01)
(52) U.S. Cl.
USPC .......................................... 709/219; 709/226
(58) Field of Classification Search
USPC .......... 709/217–219; 455/418, 419, 420, 423, 455/67.11; 714/746, 752, 763, 764, 775, 714/777, 781, 783, 784, 758
See application file for complete search history.

(56) References Cited

U.S. PATENT DOCUMENTS

| | | | |
|---|---|---|---|
| 7,322,002 B2 * | 1/2008 | Keays et al. | 714/763 |
| 7,567,575 B2 * | 7/2009 | Chen et al. | 370/401 |
| 2002/0107803 A1 * | 8/2002 | Lisanke et al. | 705/51 |
| 2005/0164694 A1 * | 7/2005 | Kim | 455/419 |
| 2006/0015580 A1 * | 1/2006 | Gabriel et al. | 709/219 |
| 2007/0083814 A1 * | 4/2007 | Wilbrink et al. | 715/716 |
| 2009/0249000 A1 * | 10/2009 | Nielsen | 711/159 |

* cited by examiner

*Primary Examiner* — Ruolei Zong
(74) *Attorney, Agent, or Firm* — Brinks Gilson & Lione

(57) ABSTRACT

A media player is utilized to determine presence of defects in storage devices, and to retrieve replacement data from media management servers. The retrieval of the replacement data is performed during playback and/or use of the storage devices. The replacement data is only utilized during real time playback of the storage devices. The replacement data can also be stored within the data storage player, into the storage devices, and/or into external storage devices accessible during playback operations. Addressing information is created and/or modified to enable use of stored replacement data. A new copy of the data can be created in the same or in new storage device. The media management server performs access authentication operations during replacement data retrieval. The media management server is accessed via user-based webpage-like interfaces and/or dedicated APIs.

23 Claims, 5 Drawing Sheets

RETRIEVING SUBSTITUTE DATA TO REPLACE DAMAGED MEDIA DATA FOR PLAYBACK IN A MEDIA PLAYER

CROSS-REFERENCE TO RELATED APPLICATIONS/INCORPORATION BY REFERENCE

[Not Applicable].

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to media processing. More specifically, certain embodiments of the invention relate to a method and system for retrieving substitute data to replace damaged media data for playback in a media player.

BACKGROUND OF THE INVENTION

Portable storage elements may be utilized to store data. These storage elements comprise, for example, hard-drives, digital video discs (DVD), compact discs (CD), video compact discs (VCD), High-Definition DVDs (HD-DVD), Blu-Ray discs, Flash cards, SIM cards, and memory sticks. The storage elements may be utilized to store various types of data, including, for example, software, backup data, and/or media data, which comprise, for example, audio and/or video streaming data. Media players may be utilized to playback media data stored in storage elements. For example, DVD players and/or PCs may be utilized to play media data stored in DVDs and/or CDs.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for retrieving substitute data to replace damaged media data for playback in a media player, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for retrieving substitute data to replace damaged media data for playback in a media player. A data storage player is utilized to determine presence of defects in storage devices, and to retrieve replacement data from a media management server. The storage devices are utilized to store various types of data including multimedia data. The retrieval of the replacement data is performed during playback and/or use of the storage devices via the data storage player. The replacement data is utilized during real time playback of the storage devices. The replacement data is also be stored to facilitate subsequent playback operations. The replacement data is stored within the data storage player; into the storage devices, via the data storage player, in accessible and unused regions in the storage devices, and/or into external storage devices that are accessible during playback operations. Addressing information is created and/or modified to enable use of stored replacement data. A new copy of the data is created where the presence and/or extent of the defects completely bars data reads from the storage devices. The new data image is written into the current storage device, via the data storage player, in accessible and unused regions in the current storage device, or into a new storage device where the current storage device is deemed unusable. The data storage player is utilized to ensure that the data reads from the current storage device is permanently disabled.

During replacement data retrieval operations, the media management server performs access authentication operations, which comprise user verification, license verification, copying verification. The media management server also enables creating and/or modifying user related portfolios to facilitate future product verifications and/or to enable user communicating. The media management server enables interactions by remote users, to request replacement data, wherein the user interactions, via the media source management server functionality, is based on user, webpage-liked, interfaces and/or dedicated APIs.

Figure 1:
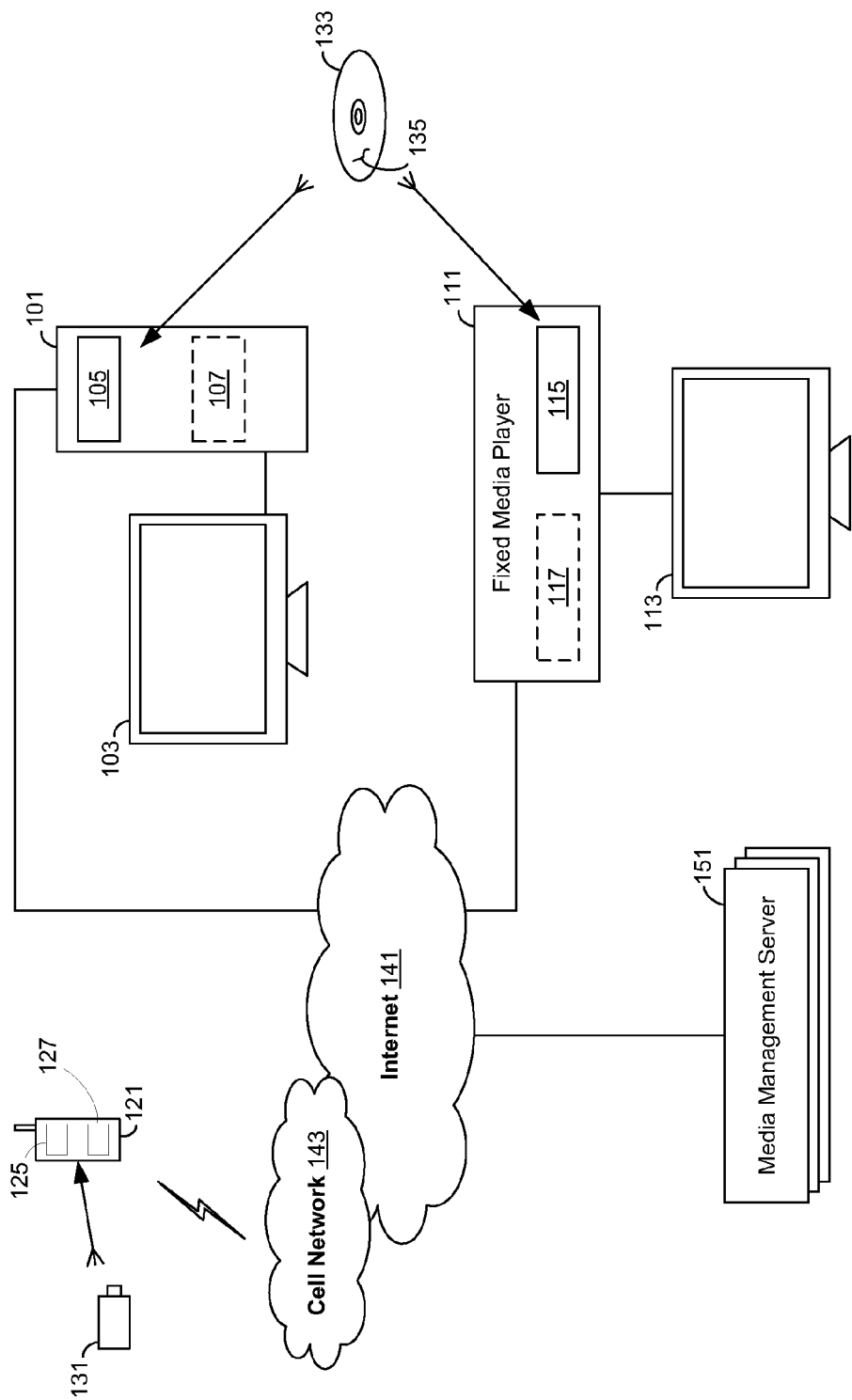
FIG. 1 is a block diagram that illustrates a media playback setup with media management server that provides replacement media data, in accordance with an embodiment of the invention.

FIG. 1 is a block diagram that illustrates a media playback setup with media management server that provides replacement media data, in accordance with an embodiment of the invention. Referring to FIG. 1, there is shown a personal computer (PC), a PC monitor 103, a PC media drive 105, a PC error detect & replacement system (EDRS) 107, a fixed media player 111, a television 113, a media drive 115, an EDRS 117, a handheld communication device 121, a media reader subsystem 125, an EDRS 127, a personal media source 131, a media storage element 133, a defect 135, internet 141, a cellular network 143, and one or more media management servers 151.

The media storage element 133 comprises a device that is utilized to store data. The media storage element 133 may comprise, for example, a hard-drives, a digital video discs (DVD), a compact discs (CD), a video compact discs (VCD), a High-Definition DVDs (HD-DVD), and/or a BluRay disc. The media storage element 133 is utilized, for example, to store media data that is played back via the PC 101 and/or the fixed media player 111. The media data is stored onto the media storage element 133 by a media provider, for example DVD producer, and writing into the media storage element 133 is disabled and/or prohibited. Alternatively, writing into the media storage element 133 is allowed, either unconditionally or subject to some limitations and conditions. The defect 135 prevents reading data from the media storage element 133, either wholly or partially. For example, where the media storage element 133 is a DVD or a CD, the defect 135 may comprise a physical scratch that prevents reading the DVD/CD, or a sector therein, by an appropriate DVD/CD player.

The PC 101 comprises suitable logic, circuitry, and/or code that enable performing a plurality of tasks, applications, and operations requested by one or more users. The PC 101 may comprise, for example, a laptop or a desktop, operable to run an operating system and to enable performing various personal tasks, including, web browsing, gaming, software applications, and/or other operations. In an exemplary aspect of the invention, the PC 101 is operable to enabled reading data from portable storage elements, for example the storage element 133, via the media drive 105. The media drive 105 comprises suitable logic, circuitry, and/or code that enable reading data from and/or writing data into one or more types of storage elements. The media drive 105 comprises, for example, a CD drive and/or a DVD drive. The PC monitor 103 comprises suitable logic, circuitry, and/or code that enable displaying graphics and/or video streams generated via the PC 101.

The PC error detect & replacement system (EDRS) 107 comprises suitable logic, circuitry, and/or code that enable detecting defects in storage element readable via a media drive, the PC media drive 105 for example. The PC EDRS 107 is also operable to enable retrieving of replacement data, for example from the media management server 151, to enable playback of media data stored in storage elements determined to have defects.

The fixed media player 111 comprises suitable logic, circuitry, and/or code that enable playback of media data stored into one or more types of storage elements. The fixed media player 111 may comprise, for example, a CD player and/or a DVD player. The media drive 115 is substantially similar to the PC media drive 105, and is operable to enable reading data from and/or writing data into one or more types of storage elements, including, for example, CDs and/or DVDs. Audio/video media streams generated from media data read via the fixed media player 111 are playable via the television 113. The television 113 comprises suitable logic, circuitry, and/or code that enable outputting and/or displaying audio/video media streams. The EDRS 117 is substantially similar to the PC EDRS 107, and as operable to enable detection of defects in storage element readable via media drive 115, and to enable retrieving replacement media data, for example from the media management server 151, to enable playback of media data stored in storage elements determined to have defects.

The handheld communication device 121 comprises suitable logic, circuitry, and/or code that enable portable communication via one or more wireless interfaces. For example, the handheld communication device 121 comprises a cellular phone that is operable to enable cellular accessibility via the cellular network 143. The handheld communication device 121 is also operable to enable performing various user-specified tasks. For example, the handheld communication device 121 is utilized to enable playback of media data that is read from the personal media source 131.

The cellular network 143 comprises suitable logic, circuitry and/or code that enable cellular communication based on one or more cellular technologies. Exemplary cellular technologies comprise CDMA, WCDMA, CDMA1000, HSDPA, GSM, GPRS, EDGE, and UMTS. Cellular basestations are utilized, for example, to enable transmission and/or reception of cellular based RF communications between the cellular network 143 and cellular capable devices, for example the handheld communication device 121. The cellular network 143 is also operable to enable communication with remote nodes and/or entities, for example the media management server, via the internet 141.

The personal media source 131 comprises a device operable to store and/or output media data. For example, the personal media source 131 may comprise a USB flash drive that is plugged into the handheld communication device 121 via a USB port to enable inputting/outputting data. The media reader subsystem 125 is operable to enable playback of media data receivable from the personal media source 131. The EDRS 127 is comprised similar to the PC EDRS 107, and as operable to enable detection of defects in storage element readable via media drive 115, and to enable retrieving replacement media data, for example from the media management server 151, to enable playback of media data stored in storage elements determined to have defects.

The media management server 151 comprises suitable logic, circuitry, and/or code that enable storage and/or retrieval of replacement data. For example, the media management server 151 is operable to enable the PC 101, the fixed media player 111, and/or the handheld communication device 121 to retrieve replacement data, via the internet 141, when the EDRS 107, the EDRS 107, and/or the EDRS 127 determines that that there is defects in the storage elements 131 and/or 133.

The Internet 141 comprises a system of interconnected networks, which enables exchange of information and/or data among a plurality of nodes, based on one or more networking standards, including, for example, TCP/IP. For example, the Internet 141 enables connectivity among a plurality of private and public, academic, business, and/or government nodes and networks, wherein the physical connectivity may be provided via the Public Switched Telephone Network (PSTN), via copper wires, fiber-optic cables, wireless interface, and/or other standards-based interfaces. In an exemplary aspect of the invention, the internet 141 provides connectivity between media management server 151, and the PC 101, the fixed media player 111, and/or the handheld device 125.

In operation, the PC 101, the fixed media player 111, and/or the handheld communication device 121 are operable to enable reading data stored in the personal media source 131 and/or the media storage element 133, via the PC media drive 105, the media drive 115, and/or the media reader subsystem 125. For example, where the media storage element 133 comprises a DVD or a CD, the PC media drive 105 and/or the media drive 115 is utilized to read out media data stored on the disc, to enable generating corresponding audio/video streams that are playable, for example, via the PC monitor 103 and/or the television 113, respectively.

In an exemplary aspect of the invention, the PC 101, the fixed media player 111, and/or the handheld communication device 121 are operable to determine presence of defects that prevent reading of data stored in the personal media source 131 and/or the media storage element 133. The PC 101, the fixed media player 111, and/or the handheld communication device 121 are then operable to retrieve, from one or more instances of the media management server 151, replacement data that enable use and/or playback of the stored data in the personal media source 131 and/or the media storage element 133. Due to the defect 135, for example, data stored in the media storage element 133 can become unreadable. For example, in instances where the media storage element 133 comprises a DVD or a CD, the defect 135 may comprise physical defects in the DVD or CD, which are scratches that result from use the DVD/CD, and/or impurities in the resin used in the manufacture of the DVD/CD. Such physical defects cause various problems that prevent or degrade readability of the media storage element 133. For example, the presence of the defect 135 can cause lockup sequences, where reading from the media storage element simply terminates at some point during playback. The presence of the defect can also cause loop situations, where reading from the media storage element repeatedly jumps to one or more points or sectors in the media storage element 133 during playback of stored media data.

To counter such issues that arise from presence of the defect 135, the PC EDRS 107 and/or the EDRS 117 are utilized to detect presences of such defects in the media storage element 133. Once the presence of the defect 135 is determined, the PC EDRS 107 and/or the EDRS 117 communicate with the media management server 151, via the internet 141 for example, to retrieve replacement data that are used to substitute for data stored in non-accessible sectors, due to the presence of the defect 135, in the media storage element 133. The replacement data, which is received via the internet 141, is then utilized to enable seamless playback of the media storage element 133. The detection and replacement of data is performed real time, during each playback, or once replacement data is received it is stored for future playback operations to avoid having to retrieve from the media management server 151 during every subsequent playback. In instances where writing is enabled in the media storage element 133, the retrieved replacement data is stored into available and accessible sectors in the media storage element 133, and addressing information is created and/or modified to enable accessing the new sectors when the defect 135 is encountered again. In an embodiment of the invention, detection of defects in personal media sources and/or storage elements is performed other than during playback operations. For example, the PC EDRS 107 and/or the EDRS 117 are operable to enable performing defect scan operations, without playback of the data stored in the media storage element 133, for the purpose of determining presence of defect and/or to retrieve replacement data, for future playback operations for example.

The retrieved replacement data is also be stored within the PC media drive 105 and/or the media drive 115, within the PC 101 and/or the fixed media player 111, and/or within some other available entity that is accessible by the PC 101 and/or the fixed media player 111 during playback operations. The detection and replacement operations is performed other than during playback, wherein the PC 101 and/or fixed media player 111 are utilized to perform, for example, analysis mode operations to ensure readability of the media storage element 133, based on user commands and/or requests for example. The EDRS 127 enable performing similar defect detection and data replacement retrieval in the handheld communication device 121, with regard to the personal media source 131, wherein the replacement data is communicated to the handheld communication device 121 via the cellular network 143 for example.

While the invention has been described with regard to storage elements utilized to store media data, wherein appropriate media players are utilized to enable media playback, the invention needs not be so limited, and similar architecture and/or methodology is utilized to enable use and/or replacement of any type of data that is stored in storage elements and is read via appropriate devices. For example, in an exemplary embodiment of the invention, use and/or replacement of software stored into storage elements, and read via appropriate devices, is performed via detection and replacement systems and/or management servers that are substantially similar to the EDRS 107, the EDRS 117, the EDRS 127, and/or the media management server 150.

Figure 2A:
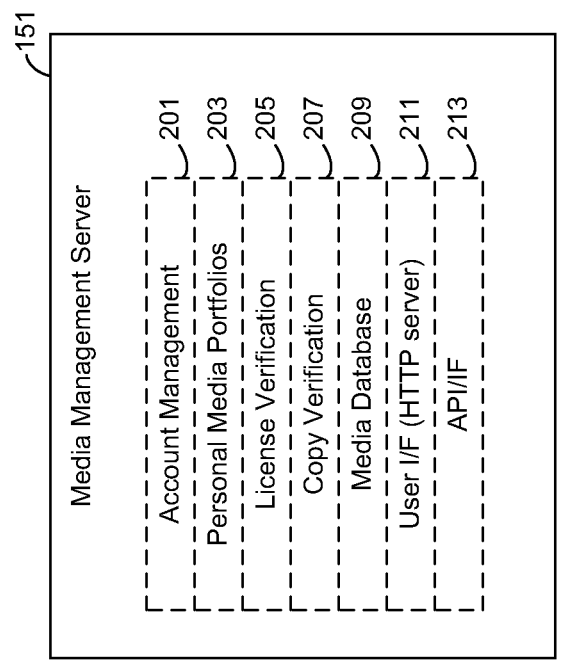
FIG. 2A is a block diagram that illustrates a media management server that provides replacement media data retrievable by media players during media playback, in accordance with an embodiment of the invention.

FIG. 2A is a block diagram that illustrates a media management server that provides replacement media data retrievable by media players during media playback, in accordance with an embodiment of the invention. Referring to FIG. 2A, there is shown the media management server 151, account management entity 201, personal media portfolios 203, licensing verification 205, copy verification entity 207, media database 209, user interface (I/F) 211, and application programming interface (API/IF) 213.

The media management server 151 is comprised substantially as described with respect to FIG. 1. In an exemplary embodiment of the invention, the media management server 151 comprises a plurality of constituent functional blocks to enable supporting replacement data retrieval. The media management server 151 comprises, for example, the account management entity 201, the personal media portfolios 203, the licensing verification 205, the copy verification entity 207, the media database 209, the user I/F 211, and the API/IF 213.

The account management entity 201 comprises functionality that enables verification of users' access information. The account management entity 201 is utilized to perform initial registration when a user attempts to access the media management server 151 for the first time. The account management 201 enables generating, storing, and/or activating user's access information, and that access information is utilized thereafter in subsequent access requests to perform the necessary access verification. The account management entity 201 also enables, for example, comparing provided access information with previously provided and/or stored information during replacement data requests processing in the media management server 151. The access information comprises various types of information, including, for example, user identifiers, user passwords, and/or addressing information for devices used by users in reading data from media storage elements. At least some of access information is provided by manufacturers and/or providers of media storage elements, or it is generated by users of the media storage elements. The personal media portfolios 203 comprises functionality that enables creating, updating, and/or modifying users media related information. The media related information comprises, for example, information tracking the media storage elements that particular users have acquired. This information is then used, for example, to facilitate product verifications and/or to enable communicating with the users where such communication is deemed necessary. The media related information is generated in the personal media portfolios 203, in suitable instances of the media management server 151, by media storage providers based on transaction with users of their products. The media related information is also generated whenever a user requests replacement data for a media storage element for the first time.

The licensing verification 205 comprises functionality that enables verifying authenticity of media storage elements that caused the replacement data requests during data reads. For example, the licensing verification 205 comprises functionality that enables media storage element providers to store product information, wherein the product information is used subsequently to match and identify media storage elements that are being read. The licensing verification 205 is utilized, for example, to enforce protection of applicable proprietary rights, copyright protections for example, pertaining to the data stored into media storage elements by media storage element providers.

The copy verification entity 207 comprises functionality that enables generating new copies of media storage elements during replacement data requests via the media management server 151. For example, where processing of replacement data indicates that the portion of inaccessible data in a media storage element is substantial, exceeding some specified threshold, the copy verification entity 207 enables creating a new copy of the media storage element. Consequently, copy verification entity 207 ensures that a whole data image is provided, and that the current media storage element is permanently disabled to prevent unauthorized and/or fraudulent copying. The licensing verification 205 and/or the copy verification are operable, for example, to enable enforcing copyright protections.

The media database 209 comprises data that can be retrieved as replacement data. The media database 209 comprises, for example, mirror copies of the data stored in media storage elements such as the media storage element 133, for example. During replacement data retrieval requests, the appropriate data is read from the media database 209 and communicated to the entity requesting the replacement data.

The user I/F 211 comprises functionality that enables interactions between users and the media management server 151, based on commonly utilized interface for example. The user I/F 211 enable, for example, remote access and/or control for replacement data retrieval via the PC 101 and the PC monitor 103 based on an HTTP based browsing interface. Consequently, the user I/F 211 will enable running a HTTP based server functionality via the media management server 151 that enable establishing peer-to-peer connection with HTTP based client functionlity running at the user end, for example via PC 101. The user I/F 211 enables, for example, prompting for and/or receiving various information from users, including, for example, access information, product information, and/or data replacement and/or copying request parameters.

The API/IF 213 comprises functionality that enables direct interactions between devices requesting replacement data and the media management server 151, based on application programming interface (API) that is specific to a server functionality running in the media management server 151. For example, once a determination, via the fixed media player 111 for example, that replacement data is needed, the API I/F 213 enables direct, device-to-device interactions to facilitate the replacement data retrieval independent of user interactions. The API I/F 213 is utilized to retrieve replacement data, for example, where there is minimal interactions needed because access information and/or verification information, for example, were previously provided and/or were predefined directly into the media management server 151 by third parties. Consequently, the API I/F 213 is utilized to enable communication of the replacement data.

Figure 2B:
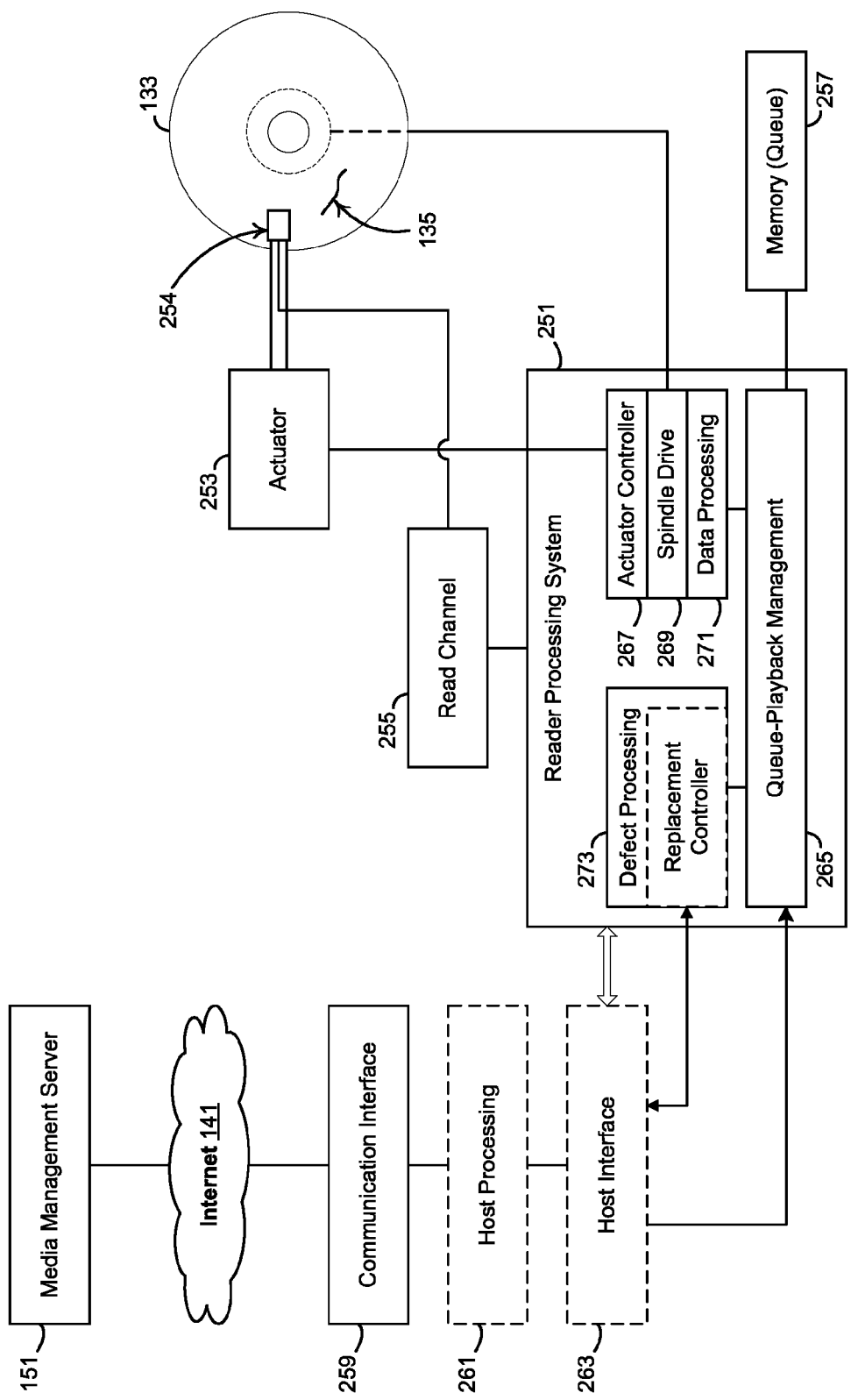
FIG. 2B is a block diagram that illustrates a media player that enables retrieving replacement media data from media players for media playback, in accordance with an embodiment of the invention.

FIG. 2B is a block diagram that illustrates a media player that enables retrieving replacement media data from media players for media playback, in accordance with an embodiment of the invention. Referring to FIG. 2B, there is shown the media storage element 133, the defect 135, the media management server 151, the Internet 141, a reader processing system 251, an actuator 253, a read channel logic 255, a memory 257, a communication interface 259, a host processing 261, host interface 263, a queue-playback management block 265, an actuator controller 267, a spindle drive 269, a data processing block 271, and a defect processing block 273.

The actuator 253 comprises suitable logic, circuitry, and/or code that enable physical interaction with media storage element to read and/or write data. For example, where the media storage element comprises an optical disc storage format, for example a DVD, the actuator 253 comprises motor circuitry moving an arm that enables a read/write actuator head 254 to move over the surface of the DVD to read and/or write data via laser signals. A spindle is utilized to rotate the DVD to enable the actuator head 254 to span different sections of the DVD.

The read channel 255 comprises suitable logic, circuitry, and/or code that enable extracting bit streams representing read data based on the physical interactions between the media storage element and the actuator head 254.

The memory 257 comprises suitable logic, circuitry, and/or code that enable storage of data, code, and/or other information. For example, the memory 257 IS utilized to enable temporary storage and/or buffering during operations by read processing system adapter 251.

The reader processing system 251 comprise suitable logic, circuitry, and/or code that enable reading data from media storage elements, for example the media storage element 133, and/or detection of defects and/or retrieval of replacement data from media management servers. The reader processing system 251 comprises, for example, the queue-playback management block 265, the actuator controller 267, the spindle drive 269, the data processing block 271, and the defect processing block 273. The actuator controller 267 comprises suitable logic, circuitry, and/or code that enable controlling the actuator 253 to facilitate reading and/or writing data from and/or to the media storage element 133. The Spindle drive 269 comprises suitable logic, circuitry, and/or code that enable controlling spindle used to facilitate rotating movable media storage elements to enable data read and/or write via the actuator head 254.

The data processing block 271 comprises suitable logic, circuitry, and/or code that enable processing data that are read from and/or written to the media storage element 133. For example, the data processing block 271 is utilized to process bit streams extracted via the read channel 255, comprising media data for example, during data reads in the reader processing system 251. The queue-playback management block 265 comprises suitable logic, circuitry, and/or code that enable managing and/or queuing data to improve play and/or display quality. The queue-playback management block 265 enables managing, for example, buffering of data used during playback operations, wherein such data buffering enable performing skip suppression for example. The queued data is buffered, for example, in the memory 257. In an exemplary embodiment of the invention, the defect processing block 273 is utilized to enable performing defect detection and replacement data retrieval in the reader processing system 251. The defect processing block 273 comprises suitable logic, circuitry, and/or code that enable detection defects in media storage elements read via the reader processing system 251, and/or retrieval of replacement data from media management servers, for example the media management server 151. In one embodiment of the invention, the reader processing system 131 may be integrated in devices to enable media playback from storage element and/or defect detection and replacement data retrieval. For example, the reader processing 131 may correspond to the PC media drive 105, the PC EDRS 107 and/or other subsystems in the PC 101 that are operable to enable defect detection and replacement data retrieval via the PC 101.

The host processing 261 comprises logic, circuitry, and/or code that enable general processing operations in a system, for example the PC 101. The host processing 261 communicates with the reader processing system via the host interface 263. The communication interface comprises logic, circuitry, and/or code that enable communication with entities via the internet 141, based on one or more networking standards, including, for example, TCP/IP. The communication interface 259 is utilized, for example, to enable communication with the media management server 151 via the internet 141 during replacement data retrieval.

In operation, the reader processing system 251 enable reading from and/or writing to media storage elements. For example, the actuator controller 267 and/or the spindle drive 269 enable utilizing the actuator 253 to interact with the media storage element 133 to extract, via the read channel 255, bit streams comprising media data. The data processing block 271 is then utilized to process the read data to extract the corresponding media streaming information; and the media streams are played back via appropriate playback logic, including, for example, the PC monitor 103 and/or the television 113. The queue-playback management block 265 is utilized, for example, to manage such playback operations, and where data buffering is determined to be required, the queue-playback management block 265 can utilize the memory 257, for example, to facilitate such data buffering.

Where issues are encountered during data reads from media storage elements, the defect processing block 273 is utilized to enable error detection, and/or to facilitate retrieval of replacement data. For example, the presence of the defect 135 could adversely affect physical interactions between the actuator head 254 and the media storage element 133, which are necessary to enable extracting bit streams comprising media data via the read channel 255. The defect processing block 273 is utilized to detect such errors, based on interactions with the read channel 255 and/or the data processing block 271 for example. The defect processing block 273 is utilized, via a replacement controller for example, to determine sectors in the media storage element 133 that are unreadable due to the presence of the defect 133. The replacement controller is then utilized to communicate with the media management server 151, via the host interface 263, the host processing 261, and/or the communication interface 259 for example, to enable requesting replacement data. The communication between the reader processing system 251 and the media management server 151 is driven via user based interface and/or based on API interface. The media management server 151 performs necessary authentication and/or verification operations, via the account management entity 201 and/or the license management 205 for example. The media management server 151 retrieves the replacement data, from the media database 209 for example, and communicates the replacement data via the internet 143. The replacement data is received via the communication interface 259, and is communicated to the reader processing system 251 via the host processing 261 and/or the host interface 263.

The queue-playback management block 265 is operable to receive the replacement data, buffering the replacement data via the memory 257 where necessary, and the replacement data is utilized to enable error-free playback of the media storage element 133. The replacement data is limited a single-time use and is discarded, or it is stored into memory 257 to enable subsequent playbacks of the media storage element 133. The replacement data is stored directly into the media storage element 133, via the reader processing system 251, wherein the replacement data is stored in accessible and unused regions in the media storage element 133. The replacement data is offloaded onto an external storage device that accessible by the user during playback operations. Addressing information is created and/or modified to enable use of stored replacement data during subsequent playback of the media storage element 133.

In an exemplary embodiment of the invention, the reader processing system 251 is utilized to enable creating new copies for media storage elements. For example, in instances where the presence and/or extent of the defect 135 completely bars data reads from the media storage element 133, a new copy of the media data is created via the reader processing system 251. The copy verification entity 207 enables verifying that creating a new copy is permitted. Replacement data, corresponding to the whole data image in the media storage element 133, is communicated to the reader processing system 251. The actuator 253 is then utilized to write the replacement data either into the media storage element 133 itself, or into a new storage element. In instances where a new storage element is utilized to store the new copy, the reader processing system 251 is also be utilized to ensure that the data reads from the current storage element is permanently disabled, by physically scratching the read/write surface using the actuator head for example.

In other embodiments of the invention, at least some of the functionality described to be performed external to the reader processing system 251 is integrated within the reader processing system 251, and/or alternatively at least some of the functionality performed within the reader processing system 251 is performed externally, via other devices and/or systems for example. The defect detection and/or replacement functionality, for example, performed via the defect processing block 273, is instead performed directly within the host processing 261. Consequently, any available reader processing architecture and/or methodology can be utilized in conjunction with the host processing 261 to enable performing the defect detection and replacement operations with no changes, and/or by making minimal changes to effectuate, for example, necessary interactions with the host processing 261 to enable performing defect detection and/or replacement functionality in the host processing 261. Also, in instances where the media playback is performed via a dedicated rather than general purpose device, for example the fixed media player 111, the host processing 261 and the host interface 263 may not exist. The reader processing system 251 is operable to interact, instead, directly with the communication interface 259, which is integrated within or located external to the reader processing system 255 for example, to facilitate communication with the media management server 151 during replacement data retrieval operations.

Figure 3A:
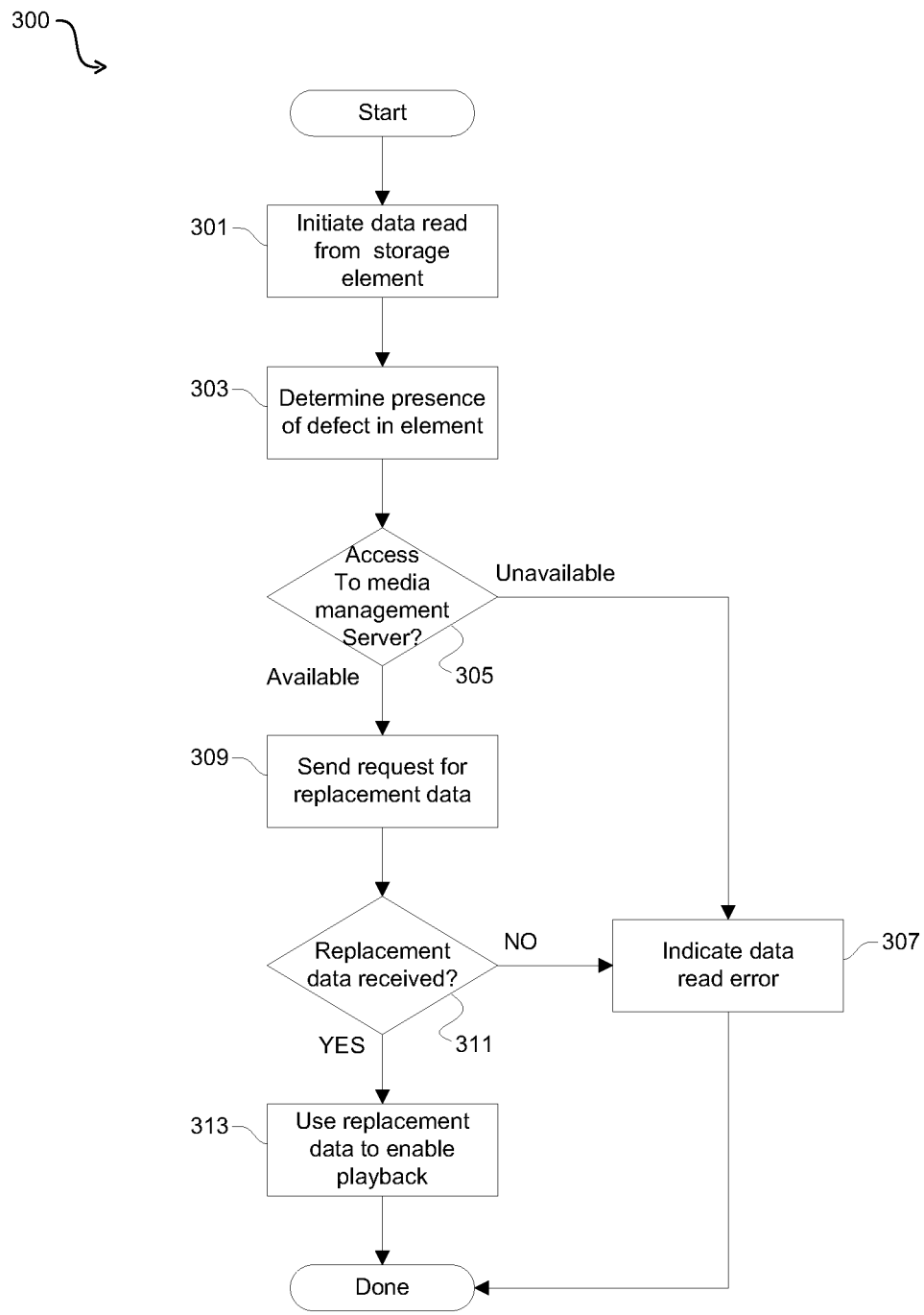
FIG. 3A is a flow chart that illustrates a media player that enables retrieving replacement media data from media players for media playback, in accordance with an embodiment of the invention.

FIG. 3A is a flow chart that illustrates a media player that enables retrieving replacement media data from media players for media playback, in accordance with an embodiment of the invention. Referring to FIG. 3A, there is shown a flow chart 300 comprising a plurality of exemplary steps, which may enable retrieving replacement media data when errors are detected during data reads.

In step 301, data read from a storage element is initiated. For example, the media storage element 131 is inserted into the PC media drive 105 in the PC 101 to initiate playback of media data stored in the media storage element 131. In step 303, defect detection is performed during media playback operations. For example, during playback of the media storage element 133 in the PC 101, the PC EDRS 107 is utilized to detect the presence of defects in the media storage element 133, for example the defect 135, that adversely affect data reads from the media storage element 131. In step 305, a determination whether media management servers are accessible is performed. For example, the PC 101, via the PC EDRS 107 for example, checks to determine if the media management server 151 is accessible to retrieve replacement data. In instances where it is determined that the media management server 151 is inaccessible, the exemplary steps proceed to step 307. In step 307, an error message indicating the data read error and media playback failure is generated. The exemplary steps then terminate.

Returning to step 305, in instances where it is determined that the media management server 151 is accessible, the exemplary steps proceed to step 309. In step 309, a request for replacement data is communicated to the media management server 151. In step 311, a determination whether replacement data is received from the media management server 151 is performed. For example, the replacement data may not be received because the replacement data request fails while performing one or more of the verifications in the media management server 151. This failure occurs because necessary data is not available in the media management server 151, and/or due to data loss in the communication between the media management server 151 and the PC 101. In an exemplary aspect of the invention, the replacement data request may be repeated for a predetermined number of retries and/or until it is determined that the failure is unrectifiable and is this final. In instances where it is determined that the replacement data is not available, the exemplary steps proceed to step 307.

Returning to step 311, in instances where the replacement data is received, the exemplary steps proceed to step 313. In step 313, the replacement data is utilized to facilitate media playback. The replacement data is utilized only once for real time playback, and/or it is stored to enable subsequent playback of the media storage element 133 and/or to generate a new copy, substantially as described with respect FIGS. 1, 2A and 2B, for example.

Figure 3B:
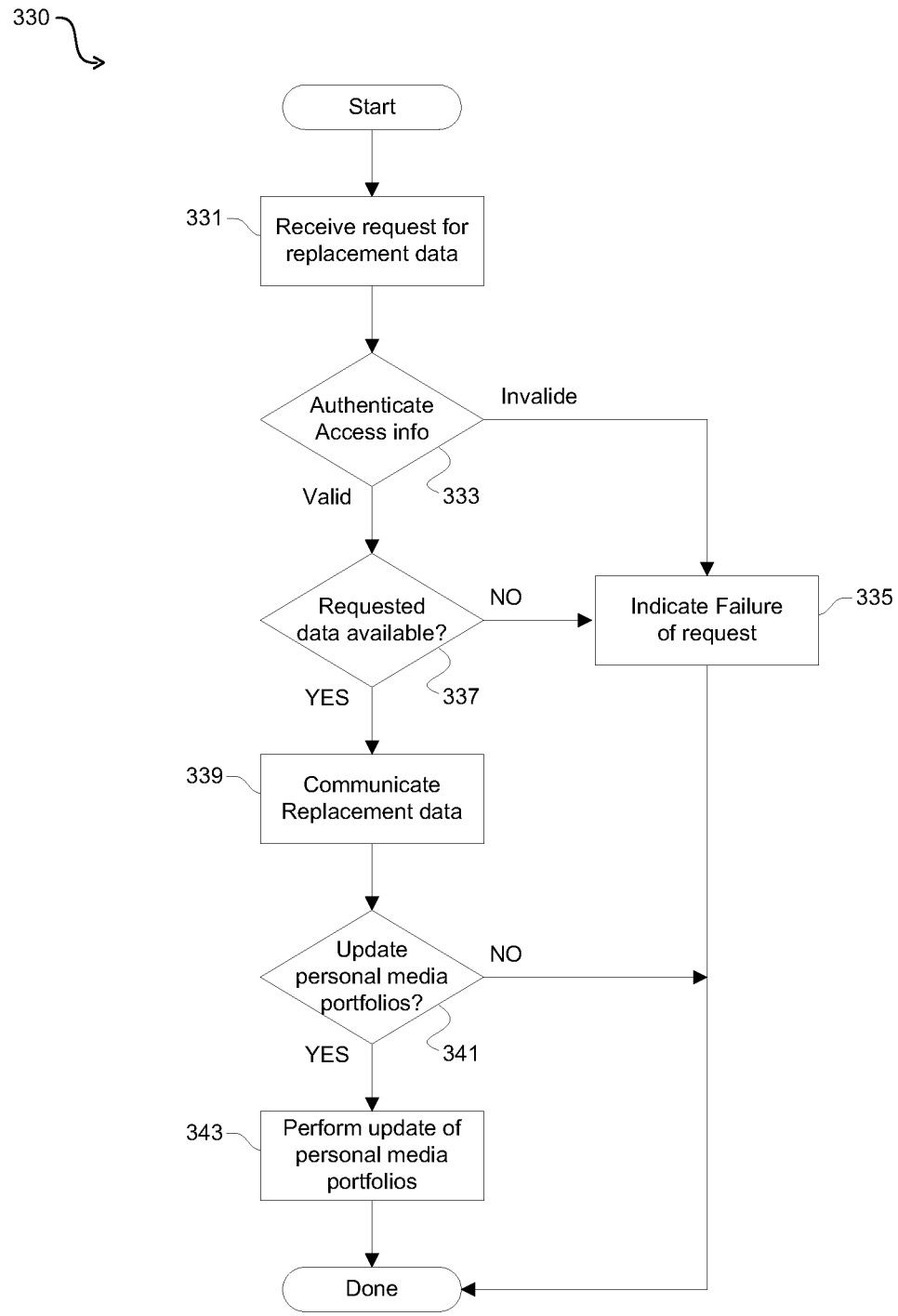
FIG. 3B is a flow chart that illustrates a media management server that provides replacement media data retrievable by media players during media playback, in accordance with an embodiment of the invention.

FIG. 3B is a flow chart that illustrates a media management server that provides replacement media data retrievable by media players during media playback, in accordance with an embodiment of the invention. Referring to FIG. 3B, there is shown a flow chart 330 comprising a plurality of exemplary steps, which may enable providing replacement media data requested via media players.

In step 331, a request for replacement data is received in a media management server 151. For example, the media management server 151 is operable to receive, via the user interface 211 and/or the API Interface 213, a request for replacement data from the reader processing system 251. In step 333, access information authentication is performed. For example, the account management entity 201, the license verification 205 and/or the copy verification entity 207 is utilized to perform necessary access authentication operations in the media management server 151, substantially as described in FIGS. 2A and 2B. In instances where access authentication fails, the exemplary steps proceed to step 335. In step 335, a request failure indication is generated and communicated back to the requesting entity. The exemplary steps then terminate.

Returning to step 333, in instances where access authentication succeeds, the exemplary steps proceed to step 337. In step 337, a determination whether the requested replacement data is available is performed. For example, the media management server 151 determines, once the access information is verified, whether the requested replacement data is available via the media database 209 for example. In instances where the requested replacement data is unavailable, the exemplary steps proceed to step 335.

Returning to step 337, in instances where the requested replacement data is available, the exemplary steps proceed to step 339. In step 339, the replacement data is communicated to the requesting entity. For example, once the replacement data is found, the media management server 151 communicates the data to the reader processing system 251. In step 341, a determination whether to update user personal media portfolios is performed. For example, after communicating replacement data, the media management server 151 determines, whether the received request indicate a need to create and/or modify the requesting user's profile, via the personal media portfolios 203, substantially as described in FIG. 2A. In instances where no personal media portfolios updates are necessary, the exemplary steps terminate. Returning to step 341, in instances where personal media portfolios updates are required, the exemplary steps proceed to step 343. In step 343, the personal media portfolios 203 is updated, substantially as described in FIG. 2A.

Various embodiments of the invention may comprise a method and system for retrieving substitute data to replace damaged media data for playback in media player. The reader processing system 251 is utilized to determine, via the defect processing block 273, presence of defects in the media storage element 133, and to retrieve via replacement controller replacement data from the media management server 151. The media storage element 133 is utilized to store various types of data including media data that is played back via the PC 101 and/or the fixed media player 111. The retrieval of the replacement data is performed during playback and/or use of the media storage element 133 via the reader processing system 251. The replacement data is utilized during real time playback of the media storage element 133. The replacement data is also stored to facilitate subsequent playback operations. The replacement data is stored within the memory 257 of the reader processing system 251, into the media storage element 133 via the reader processing system 251, in accessible and unused regions in the media storage element 133, and/or into external storage devices that are accessible during playback operations. Addressing information is created and/or modified to enable use of stored replacement data. A whole new copy of the data is created where the presence and/or extent of the defects completely bars data reads from the media storage element 133. The new data image is written into the media storage element 133, via the reader processing system 251, in accessible and unused regions in the media storage element 133, or into a new storage device where is the media storage element 133 is deemed unusable. The reader processing system 251 is then utilized to ensure that the data reads from the media storage element 133 is permanently disabled.

During replacement data retrieval operations, the media management server 151 performs access authentication operations, via the account management entity 201, the license verification 205, and/or the copy verification entity 207. The media management server 151 also enables creating and/or modifying user related portfolios via the personal media portfolios 203, to facilitate future product verifications and/or user communicating. The media management server 151 enables interactions by remote users, to request replacement data, wherein the user interactions are based on webpage-liked interfaces via the user interface 211 and/or based on dedicated APIs via the API interface 213.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for retrieving substitute data to replace damaged media data for playback in media player.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for data processing, the method comprising:
    determining by a reader device, presence of defects in a magnetic medium, an optical medium or a magneto-optical medium of a storage device, wherein said defects prevent reading of at least a portion of data from the magnetic medium, an optical medium or a magneto-optical medium of said storage device;
    communicating access information to a remote management server, wherein said communicated access information causes a user authentication operation and a copy verification operation to occur in said remote management server;
    retrieving corresponding replacement data corresponding to said at least said portion of said data from said remote management server, based on success of said user authentication operation, including retrieving a new copy of said data stored in said storage device for storage and subsequent use and playback of said replacement data if the copy verification operation determines that said portion of data from said storage device exceeds a threshold;
    identifying available and accessible portions the storage device; and
    writing the replacement data in one or more identified available and accessible portions of the storage device.

2. The method according to claim 1, wherein said read data comprises multimedia information.

3. The method according to claim 1, wherein said storage device comprises a magnetic storage device, an optical storage device, a magneto-optical storage device, a magneto-electronic storage device, or a solid state storage device.

4. The method according to claim 1, comprising retrieving said replacement data from said remote management server during playback or use of said data.

5. The method according to claim 1, wherein said communicated access information causes said remote management server to enforce protection of applicable proprietary rights during said user authentication operation.

6. The method according to claim 1, comprising storing said retrieved replacement data to enable subsequent use or playback of said stored data by said storage device.

7. The method according to claim 1, further comprising adapting addressing information for accessing the one or more identified available and accessible portions of the magnetic medium, the optical medium or the magneto-optical medium which are not subject to defects which prevent reading and writing data at the available and accessible portions of the storage device during subsequent use or playback of said replacement data.

8. The method according to claim 1, further comprising disabling the portion of the data which the defects prevent reading.

9. The method according to claim 8, comprising disabling use of said storage device after said creation of said new copy of said stored data into a said storage device.

10. The method according to claim 1, wherein said remote management server performs user authentication to allow said retrieval of said replacement data.

11. The method according to claim 10, wherein said remote management server creates or updates personal user portfolios based on said user authentication.

12. The method according to claim 1, wherein said remote management server performs license verification to authenticate said stored data in said storage device.

13. A system for data processing, the system comprising:
    one or more circuits for use in a reader device, said one or more circuits being operable to:
    determine presence of defects in a magnetic medium, an optical medium or a magneto-optical medium of a storage device, wherein said defects prevent reading of at least a portion of data from the magnetic medium, an optical medium or a magneto-optical medium of said storage device;
    communicate access information to a remote management server, wherein said communicated access information causes a user authentication operation and a copy verification operation to occur in said remote management server, the copy verification operation comparing a defective amount of said portion of data with a threshold;
    retrieve replacement data corresponding to said at least said portion of said data from said remote management server, based on success of said user authentication operation;
    retrieve from said remote management server a new copy of said data stored in said storage device for storage and subsequent use and playback of said replacement data if the copy verification operation determined that the defective amount of said portion of data from said storage device exceeds the threshold;

identify available and accessible portions of the magnetic medium, an optical medium or a magneto-optical medium which are not subject to defects which prevent reading and writing data at the available and accessible portions of the storage device where the replacement data may be written for subsequent use and playback of the replacement data; and write the replacement data in one or more identified available and accessible portions of the storage device.

14. The system according to claim 13, wherein said read data comprises multimedia information.

15. The system according to claim 13, wherein said one or more circuits are operable to retrieve said replacement data from said remote management server during playback or use of said data.

16. The system according to claim 13, wherein said communicated access information causes said remote management server to enforce copyright protection for said at least a portion of data during said user authentication operation.

17. The system according to claim 13, wherein said one or more circuits are operable to store said retrieved replacement data to enable subsequent use or playback of said stored data by said storage device.

18. The system according to claim 17, wherein said one or more circuits are further configured to create or modify addressing information for accessing the one or more identified available and accessible portions of the magnetic medium, the optical medium or the magneto-optical medium which are not subject to defects which prevent reading and writing data at the available and accessible portions of the storage device during subsequent use or playback of said replacement data.

19. The system according to claim 13, wherein said one or more circuits are operable to disable the portion of data and replace defective data with the retrieved new copy for subsequent use and playback of said retrieved new copy.

20. The system according to claim 19, wherein said one or more circuits are operable to disable use of said storage device after said creation of said new copy of said stored data into a new storage device.

21. The system according to claim 13, wherein said remote management server performs user authentication to allow said retrieval of said replacement data.

22. The system according to claim 21, wherein said remote management server creates or updates personal user portfolios based on said user authentication.

23. The system according to claim 13, wherein said remote management server performs license verification to authenticate said stored data in said storage device.

* * * * *

UNITED STATES PATENT AND TRADEMARK OFFICE
CERTIFICATE OF CORRECTION

PATENT NO. : 8,667,087 B2
APPLICATION NO. : 12/323298
DATED : March 4, 2014
INVENTOR(S) : James D. Bennett et al.

It is certified that error appears in the above-identified patent and that said Letters Patent is hereby corrected as shown below:

In the Claims

In column 14, claim 1, line 1, after "and accessible portions" insert --of--.

Signed and Sealed this
Twenty-fourth Day of June, 2014

Michelle K. Lee
*Deputy Director of the United States Patent and Trademark Office*